(12) United States Patent
Turbovich et al.

(10) Patent No.: US 11,216,606 B1
(45) Date of Patent: Jan. 4, 2022

(54) METHOD AND SYSTEM FOR FUNCTIONAL SAFETY VERIFICATION USING FAULT RELATION RULES

(71) Applicant: Cadence Design Systems, Inc., San Jose, CA (US)

(72) Inventors: Ophir Turbovich, Haifa (IL); Muhammad Zoabi, Haifa (IL); Yuval Shpak, Haifa (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/942,801

(22) Filed: Jul. 30, 2020

(51) Int. Cl.
  *G06F 30/3308* (2020.01)
  *G06F 119/02* (2020.01)
  *G06F 117/04* (2020.01)

(52) U.S. Cl.
  CPC ...... *G06F 30/3308* (2020.01); *G06F 2117/04* (2020.01); *G06F 2119/02* (2020.01)

(58) Field of Classification Search
  USPC ........................................................ 716/106
  See application file for complete search history.

(56) References Cited

U.S. PATENT DOCUMENTS

| 2002/0011827 | A1* | 1/2002 | Ishida | G01R 31/318342 324/71.5 |
| 2010/0229061 | A1* | 9/2010 | Hapke | G01R 31/318342 714/740 |
| 2019/0050307 | A1* | 2/2019 | Locker | G06F 30/15 |

* cited by examiner

*Primary Examiner* — Bryce M Aisaka
(74) *Attorney, Agent, or Firm* — Pearl Cohen Zedek Latzer Baratz LLP (57) ABSTRACT

A computer implemented method for functional safety verification includes simulating SA0 and/or SA1 faults at a Q output port of each sequential element in a first representation of an electronic design, to determine whether any of the simulated faults is detectable by a safety mechanism, determining, based on one or more fault relation rules and based on a second gate-level representation of the electronic design, whether any of the faults is also detectable by the safety mechanism if occurred at one or more input ports of the respective sequential element or one or more input ports of a clockgate of the respective sequential element, and identifying a remainder of input ports and input ports of a clockgate of each of the sequential elements at which the faults are not determined to be detectable by the safety mechanism based on the one or a plurality of fault relation rules.

20 Claims, 6 Drawing Sheets

METHOD AND SYSTEM FOR FUNCTIONAL SAFETY VERIFICATION USING FAULT RELATION RULES

FIELD OF THE INVENTION

The present invention relates to verification of electronic designs. More specifically the present invention relates to method and system for functional safety verification of an electronic design using fault relation rules applicable on sequential logic elements of the electronic design.

BACKGROUND OF THE INVENTION

Design verification is a common process for testing a newly designed integrated circuit, board, or system-level architecture, to, for example, confirm that it complies with the requirements defined by the specification of the architecture for that device.

Verification of electronic designs typically has three forms. At an early stage, before the electronic design is implemented in hardware, simulation can be conducted on a model of the design. Another form can be emulation, in which one electronic hardware is used to mimic the behavior of another (tested) electronic hardware. At more advanced stages of design development, a system on a chip can be validated, in a process which is typically referred to as post-silicon verification. Post-silicon verification can be a last stage in the electronic design development, for example, after manufacturing.

Another form of verification is formal verification, which rather than testing a device under test (DUT), can be aimed at proving or disproving the correctness of a given logic with respect to a certain formal specification, using formal methods of mathematics.

Electronic Design Automation (EDA) tools exist which can include computer implemented applications that are designed to carry our various verification tasks.

Electronic systems and devices in various fields (e.g., automotive industry, aerospace industry, military industry, etc.) can be required to comply with functional safety standards and/or other reliability requirements. For example, a functional safety standard may dictate that if a fault is found in the braking system of a car, the car is immobilized, so as to prevent driving the car with a faulty brake system. In another example, if the headlight system of a car is faulty, the car lights can remain on. Various standards (e.g., ISO 26262 in the automotive industry) can define the safety risk levels that are industry-wide acceptable standards for particular industries.

To monitor compliance with functional safety standards, various safety mechanisms may be embedded in a system (e.g., in an integrated circuit), designed to identify faults, e.g., incorrect steps, process or data definition which may cause unintended or unanticipated event in the logical flow and act in accordance with the functional safety standard requirements.

There may be various kinds of faults in integrated circuits (hereinafter ICs, also electronic designs). For example, a fault may be a result of a bug in the electronic design that was undetected during the verification process in the production of the electronic design. A fault may also occur in an electronic design as a result of excessive heat, irregular pressure, cosmic radiation, age of the electronic design, and/or or other causes. A fault can cause a malfunction, for example, in a gate of the electronic design. For example, a gate that is normally expected to output zero or one, may be affected by cosmic radiation, and have a fault such that it only outputs one value (e.g., zero or one)—this is a fault that is known as "Stuck at" fault.

When performing functional safety verification, many points in an electronic design have to be checked to verify that any fault in each and every point is detectable. This is a tedious job that may take a long time to complete. It may be desired to reduce the number of points to be checked by applying fault relation rules.

SUMMARY OF THE INVENTION

There is thus provided, according to some embodiments of the present invention, a computer implemented method for functional safety verification of an electronic design. The method may include simulating one or both faults of a set of faults consisting of stuck at zero (SA0) and stuck at one (SA1) at a Q output port of each sequential element of a plurality of sequential elements in a first representation of the electronic design, to determine whether any of said simulated one or both faults is detectable by a safety mechanism of the electronic design.

The method may also include, using the processor, obtaining a second gate-level representation of the electronic design that is equivalent to the first representation.

The method may also include, using the processor, determining, based on one or a plurality of fault relation rules and based on the second representation of the electronic design, for each of said sequential elements for which it was determined that one or both of the simulated faults are detectable at the Q output port, whether any of the faults of the set of faults is also detectable by the safety mechanism if occurred at one or more input ports of that sequential element or one or more input ports of a clockgate of that sequential element.

The method may also include, using a processor, identifying a remainder of input ports of each of the sequential elements and input ports of a clockgate of each of the sequential elements that are not determined to be detectable by the safety mechanism based on the one or a plurality of fault relation rules.

The method may also include, using the processor, simulating one or both faults of the set of faults at the remainder of input ports and input ports of a clockgate of each of the sequential elements to determine whether said simulated one or both faults are detectable by the safety mechanism.

According to some embodiments of the present invention, the method further includes calculating, using the processor, a diagnostic coverage grade for the safety mechanism of the electronic design based on detectability of the simulated one or both faults at the Q output port of each of said sequential elements and on detectability of said one or both faults based on the one or a plurality of fault relation rules.

According to some embodiments of the present invention, the first representation of the electronic design is a register transfer level (RTL) representation.

According to some embodiments of the present invention, said sequential elements comprise data flip-flops (D-FFs)

According to some embodiments of the present invention, the set of one or a plurality of fault relation rules includes a first rule stating that when (i) SA0 at an output port Q of a data flip-flop (D-FF) of said D-FFs is detectable and (ii) a reset value for that D-FF is zero, each of the following statements is true: (a) SA0 on input port D of D-FF is also detectable; (b) SA0 or SA1 at clock toggle port of D-FF are, each, also detectable; and (c) if a clockgate exists SA0 on EN input port of the clockgate is detectable.

According to some embodiments of the present invention, the set of one or a plurality of fault relation rules includes a second rule stating that when (i) SA1 at output port Q of a D-FF of said D-FFs is detectable, and (ii) a reset value for that D-FF is one, each of the following statements is true: (a) SA1 on input port D of the D-FF is also detectable; (b) SA0 or SA1 at clock toggle input port of the D-FF are, each, also detectable; and (c) if a clockgate exists, then SA0 on the EN input port of the clockgate is detectable too.

According to some embodiments of the present invention, the set of one or a plurality of fault relation rules includes a third rule stating that when (i) SA1 and SA0 at output port Q of a D-FF of said D-FFs, are, each, detectable, each of the following statements is true: (a) SA0 or SA1 at clock toggle input port of the D-FF are, each, also detectable; and (b) if a clockgate exists, then SA0 on the EN input port of the clockgate is detectable too.

According to some embodiments of the present invention, said sequential elements comprise D-Latch flip-flops.

According to some embodiments of the present invention, the set of one or a plurality of fault relation rules includes a fourth rule stating that when SA1 and SA0 are detectable at output port Q of a D Latch of said D-latch flip flops, SA0 at EN input port of the D Latch is detectable too.

According to some embodiments of the present invention, a system for functional safety verification of an electronic design is provided. The system may include memory: and a processor configured to obtain a first representation of the electronic design; to simulate one or both faults of a set of faults consisting of SA0 and SA1 at a Q output port of each sequential element of a plurality of sequential elements in the first representation of the electronic design, to determine whether any of said simulated one or both faults is detectable by a safety mechanism of the electronic design: to obtain a second gate-level representation of the electronic design that is equivalent to the first representation; to determine, based on one or a plurality of fault relation rules and based on the second representation of the electronic design, for each of said sequential elements for which it was determined that one or both of the simulated faults are detectable at the Q output port, whether any of the faults of the set of faults is also detectable by the safety mechanism if occurred at one or more input ports of that sequential element or one or more input ports of a clockgate of that sequential element; and to identify a remainder of input ports of each of the sequential elements and input ports of a clockgate of each of the sequential elements that are not determined to be detectable by the safety mechanism based on the one or a plurality of fault relation rules.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding," "associating," "selecting," "evaluating," "processing," "computing," "calculating," "determining," "designating," "allocating," or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

According to some embodiments of the present invention, a method for performing functional safety verification of an electronic design is disclosed herein, which allows reducing the number checks by applying fault relations in sequential logic elements.

In functional safety verification, the verification expert (hereinafter—user, for brevity) uses (e.g., runs and/or performs) tests on the electronic design (e.g., on model representation of the electronic design) in a normal operational mode and injects a fault (e.g., forces a value to be assigned to an input or output of an element of the electronic design). In functional safety verification, it can be desired to ensure that any fault that can propagate along the cone of influence (COI) downstream in the design is detected, so that upon detection a safety mechanism may properly react to the detected fault by applying a safety measure in accordance with the required safety standard.

For example, the user may define functional points (may also be referred to as "propagation points"), at which a fault should to be identified (detected), and define detection points on the electronic design at which a propagating signal is checked to detect a fault. It can be desired to eliminate and/or greatly reduce the number of faults that may pose a threat to the proper operation of the electronic design. It can be desirable to eliminate and/or greatly reduce the number of faults that are not detected.

In order to, for example, meet functional safety standards (e.g., ISO 26262), fault detection in an electronic design can be carried out in a final netlist, which can be a gate-level representation of the electronic design. A simulation test can be carried out for each point in the electronic design, which can involve injecting a fault into that point, in order to determine likelihood that the respective fault propagates downstream the COI to a fault detection point, rendering the respective fault detectable.

Such testing may involve millions of simulation runs that may take very long time (e.g., hours, days, etc.) to complete.

For example, logical gates may have one or more inputs and one or more outputs (gate inputs and outputs are hereinafter referred to as "points"), and functional safety verification, inter-alia may require determining whether a fault in each of these faults can be detected. As an electronic chip may include millions (e.g., hundred millions) of gates, this means covering points whose number is practically triple the number of gates. This is clearly a very tedious and exhaustive task.

There may be two types of faults: permanent faults and transient faults. A permanent fault is typically characterized as having a net shortened to another net (e.g., a supply net). Faults like SA0 or SA1 are typical permanent faults. In transient fault a memory element (e.g., FF) gets its value flipped (from zero to one or vice versa), for example, as a result of cosmic gamma radiation. A transient fault occurs temporarily and when a new value is assigned to the memory element the fault is gone.

There are some known techniques of reducing the number of points to be checked for faults, one of which is using fault relations.

Fault relations may be considered, that exist between inputs and/or outputs of combinatory logic elements (e.g., logical gates). In the verification process of ICs, that is part of the production process of these ICs, data may be input into flip-flops (FFs) of logical gates and data from these inputs and outputs of the electronic design combinatory logic elements is retrieved after a predetermined number of clock cycles to check for faults.

There are various known fault relations which may be used to reduce the number of point checks. A fault equivalence occurs, for example, when a certain fault signal at an input of a combinatory logic element is always equivalent to the signal at the output of that combinatory logic element. For example, in an AND gate, all SA0 signals (input or output1) are equivalent. If SA0) is detected at an input of the AND gate, a SA0 signal is bound to be detected at the output of that AND gate, and vice versa. Similarly, in an OR gate all SA1 fault signals are equivalent. In a NAND gate, all input SA0 faults are equivalent to all output SA1 faults. In a NOR gate all input SA1 faults are equivalent to output SA0 faults. In an inverter gate, input faults SA1 and output faults SA0 are equivalent, and input faults SA0 and output faults SA1 are equivalent. When a pair of fault signals is found to be equivalent, there is no need to conduct functional safety verification checks on both, thus reducing the number of points that need checking. There is no need to perform functional safety verification checks on all equivalent faults, as checking one fault is equivalent to checking all its equivalent faults. If a fault of a pair of fault equivalents propagates, it may be determined that its equivalent fault also propagates.

Another fault relation is fault dominance. For example, in an AND gate, output SA1 dominates any input SA1. In a NAND gate output SA0 dominates any input SA1. In an OR gate output SA0 dominates any inputs SA0. In a NOR gate output SA1 dominates any inputs SA0. Reducing the set of faults to be analyzed may therefore be based on the dominance relation.

A fault is typically defined by several factors: the net on which that fault occurred, the type of that fault, and the clock time at which it occurred.

Functional safety verification signoff can typically be done on a final netlist (final gate-level). In theory, every permanent fault can be checked to determine whether it affects the required safety level. Because performing simulation on each and every fault may be impractical, a functional safety verification work flow can include checking a limited set of faults that accomplishes enough coverage, and if the desired coverage is obtained, the tested electronic design may be declared safe enough. By using faults relation some fault checks may be skipped, reducing the number of required simulations. There may be some flaws to the above mentioned work-flow. The reduction in point checking resulting from this work flow may be rather small, since the fault relations may be limited to very few types of elements and may not cross flip-flop boundaries. Also, gate level test coverage may be rather low, and in many instances it may be hard to detect high percentage of faults using these tests.

In functional safety verification there is typically no data injection into FFs, as test data may only be input into external inputs. It may be desired to reduce the number checks of sequential components of an electronic design, e.g., FF input and/or output points, in functional safety verification, by applying fault relation rules relating to input and output states of these sequential logic elements.

Fault relations, according to some embodiments of the invention, may be applied in order to reduce the number of points that need checking. For example, reducing the number of points that need checking may include identifying fault equivalence relations, in which selecting one of the equivalent points (no matter which one) and checking that point may be sufficient to determine for the entire group of equivalent points whether they comply with the required functional safety requirements (e.g., are detectable by a safety mechanism and therefore may be treated by the safety mechanism in accordance with safety requirements). For example, reducing the number of points that need checking may include identifying fault dominance relations, in which selecting the dominant point and checking that point may be sufficient to determine for the entire group of dominance points whether they comply with the required functional safety requirements.

Fault relation rules, according to some embodiments of the invention, may define relations between ports of sequential logic elements.

Figure 1:
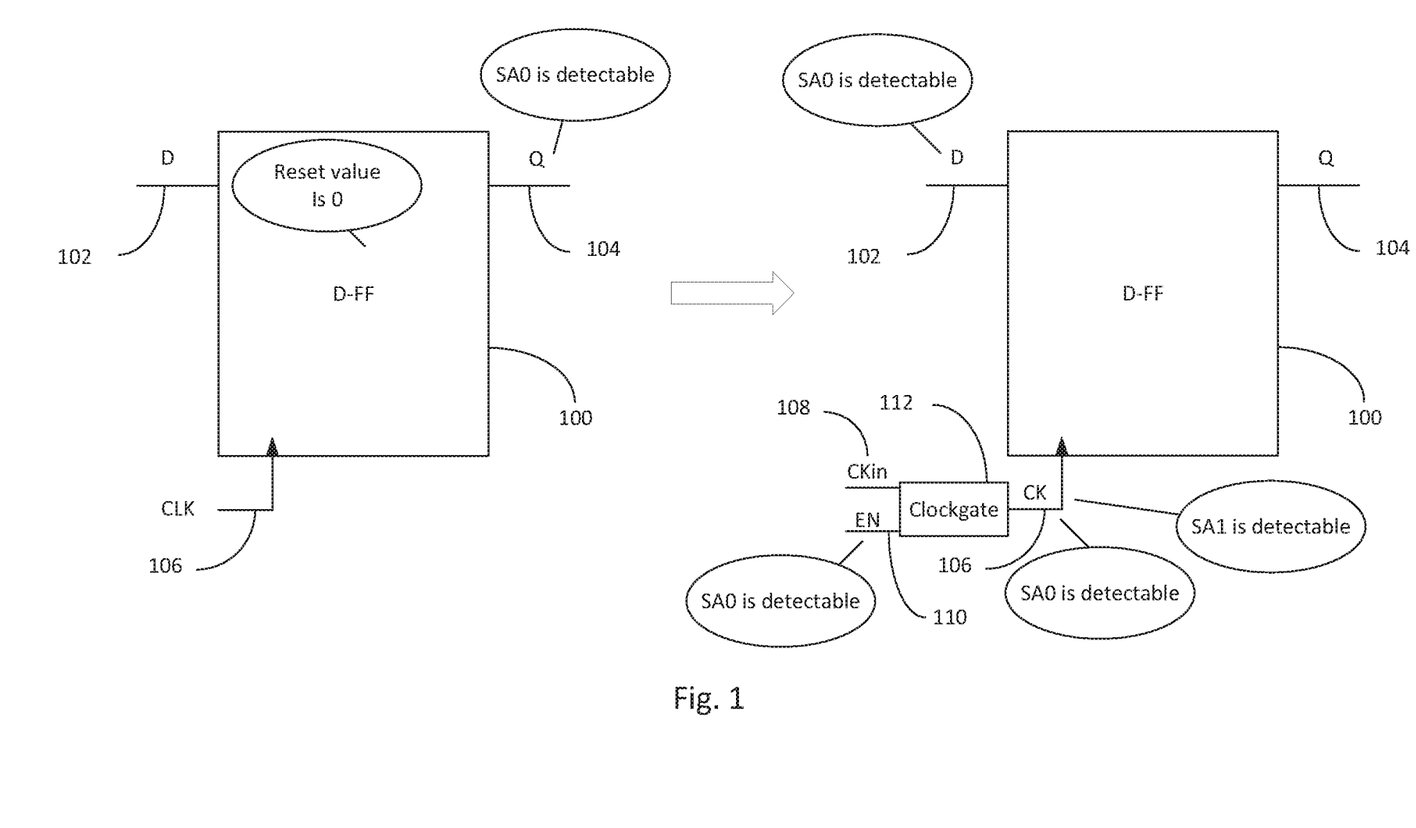
FIG. 1 illustrates a first fault relation relating to a sequential logic element (data FF in this example), according to some embodiments of the present invention.
Figure 2:
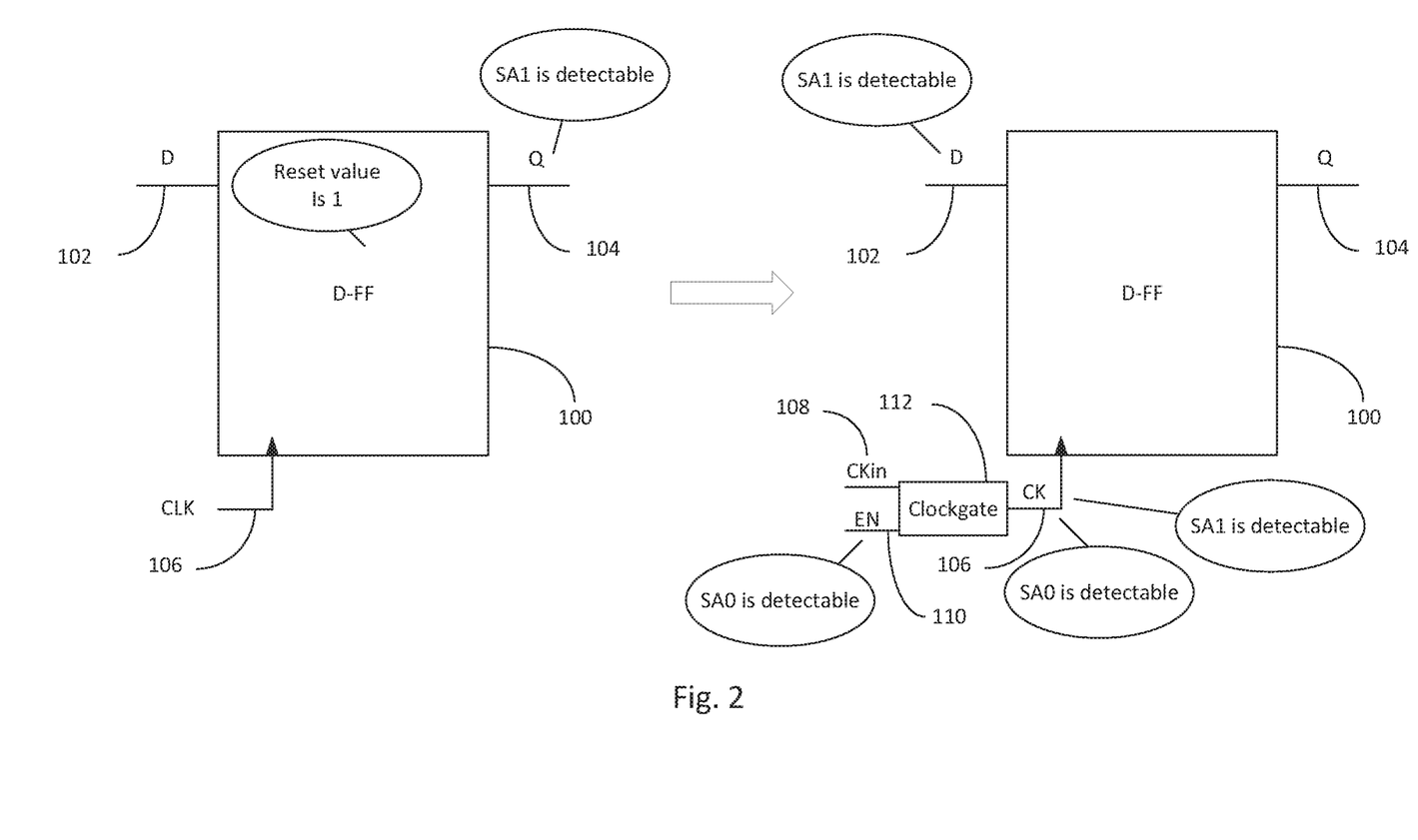
FIG. 2 illustrates a second fault relation relating to a sequential logic element (data FF in this example), according to some embodiments of the present invention.
Figure 3:
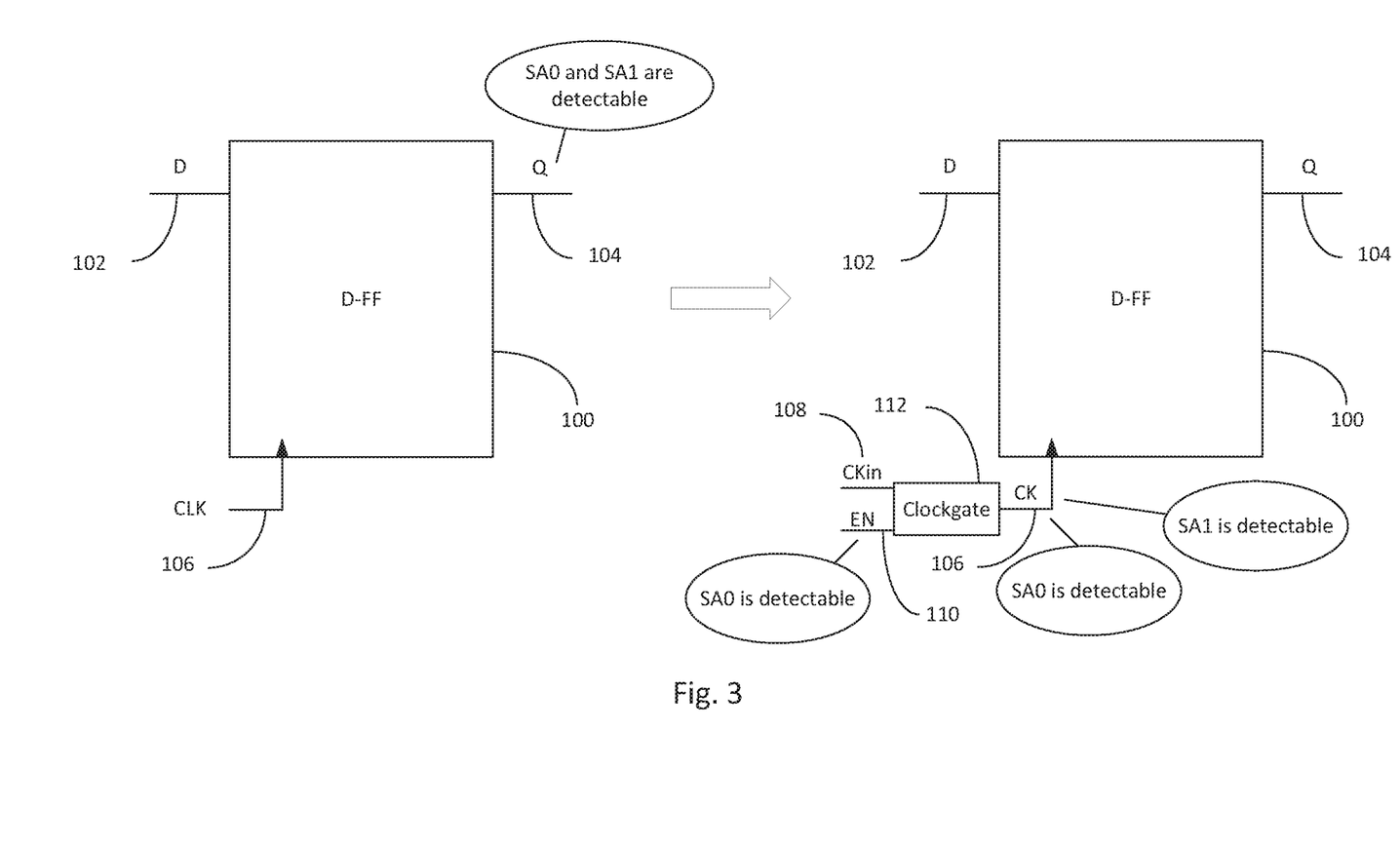
FIG. 3 illustrates a third fault relation relating to a sequential logic element (data FF in this example), according to some embodiments of the present invention.
Figure 4:
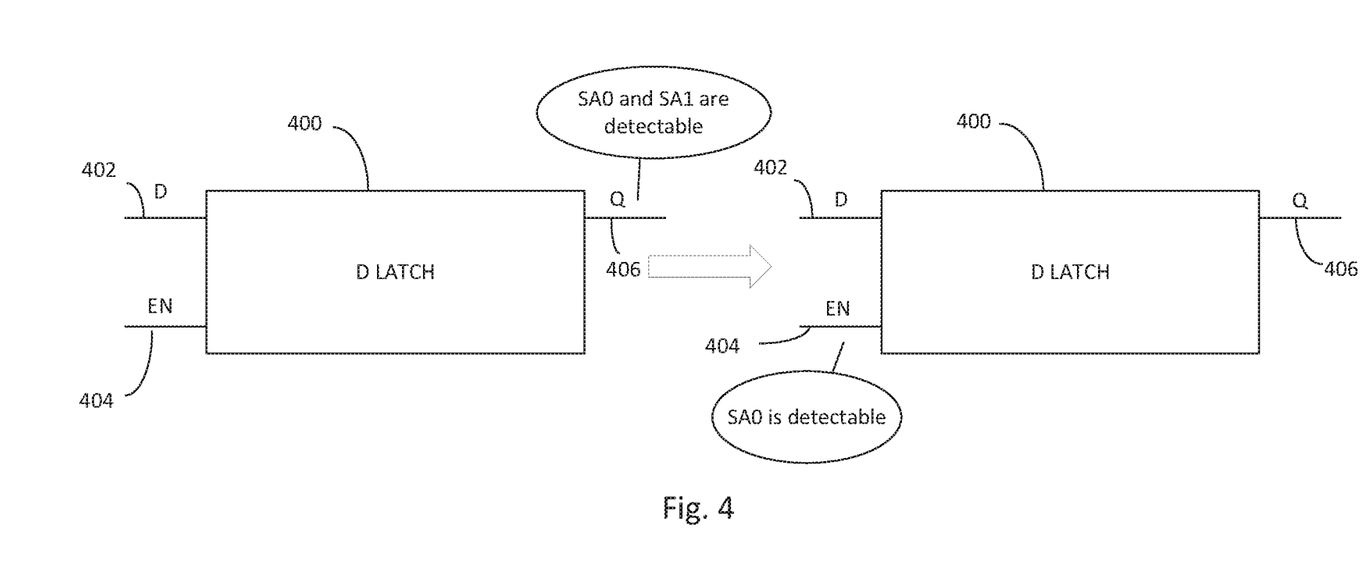
FIG. 4 illustrates a fourth fault relation relating to a sequential logic element (data latch in this example), according to some embodiments of the present invention.

FIGS. 1 to 3 relate to a data FF (D-FF), and FIG. 4 relates to a data latch (D latch).

FIG. 1 illustrates a first fault relation rule relating to a sequential logic element (D-FF 100 in this example), according to some embodiments of the present invention.

The first fault relation rule, according to some embodiments of the present invention, states that when (i) SA0 at output port Q 104 of FF 100 (e.g., a fault is forced on output port Q 104) is detectable at a detection point (propagates at least to the detection point downstream the COI), and (ii) the reset value for that FF is 0 (zero) ((i) and (ii) defining a first condition), each of the following statements is true: (a) SA0 on input port D 102 is also detectable as it would propagate further into the COI; (b) SA0 or SA1 at clock toggle port 106 are, each, also detectable and would propagate downstream the COI: and (c) if a clockgate 112 exists that takes as inputs clock-in signal at CKin input port 108 and enable signal at EN input port 110, to affect clock gating on FF 100, SA0 on the EN input port 110 of the clockgate 112 is detectable and would propagate downstream the COI.

FIG. 2 illustrates a second fault relation relating to a sequential logic element (data FF in this example), according to some embodiments of the present invention.

The second fault relation rule, according to some embodiments of the present invention, states that when (i) SA1 at output port Q 104 of FF 100 is detectable, and (ii) the reset value for that FF is 1 (one) ((i) and (ii) defining a second condition), each of the following statements is true: (a) SA1 on input port D 102 is also detectable; (b) SA0 or SA1 at clock toggle input port 106 are, each, also detectable: and (c) if a clockgate 112 exists, then SA0 on the EN input port 110 of the clockgate 112 is detectable too.

FIG. 3 illustrates a third fault relation relating to a sequential logic element (data FF in this example), according to some embodiments of the present invention.

The third fault relation rule, according to some embodiments of the present invention, states that when SA1 and SA0 at output port Q 104 of FF 100 are, each, detectable, each of the following statements is true: (a) SA0 or SA1 at clock toggle input port 106 are, each, also detectable; and (b) if a clockgate 112 exists, then SA0 on the EN input port 110 of the clockgate 112 is detectable too.

FIG. 4 illustrates a fourth fault relation rule relating to a sequential logic element (data latch in this example), according to some embodiments of the present invention. Data latch 400 typically includes data input port 402, EN input port 404 for enabling signal input, and output port Q 406.

The fourth fault relation rule, according to some embodiments of the present invention, states that when (i) SA1 and (ii) SA0 are detectable when occurring at output port Q 406 of D Latch 400 ((i) and (ii) defining a fourth condition), SA0 at EN input port 404 is detectable too.

Thus, an EDA tool, according to some embodiments of the invention, may apply any of the fault relation rules and based on these rules reduce the number of fault checks, by skipping faults that are determined to be detectable based on these rules, without actually checking these faults.

In many electronic designs, the RTL representation of the electronic design is much easier to read and debug. In a typical verification flow, RTL tests are carried out on a smaller portion of the design, and 100% coverage is targeted for these tests.

Gate-level tests may be carried out on the entire design, and there may be very few and limited gate-level tests. The target in gate-level tests may be not necessarily reaching 100% coverage, but checking that nothing was missed during the synthesis process (e.g., there may be synthesis bugs that will cause a gate-level design not to be equivalent to an RTL representation of that design. Also, the behavior of a gate-level design in simulation might be different then the simulation behavior of an RTL representation of that design, e.g., around x-propagation), and seeking timing problems that are hard to reach in static timing analysis.

A workflow of functional safety verification of an electronic design, according to some embodiments of the present invention, may include obtaining a first intermediate representation (IR) (e.g., an RTL representation) of the electronic design, identifying Q ports of FFs of the electronic design, and determining, for each of the Q ports whether a SA0 fault and/or a SA1 fault is/are detectable, by simulating SA0 fault and/or SA1 fault at the identified Q ports and checking whether the faults SA0 and/or SA1 are detectable at one or more other points (e.g., safety mechanism inside or outside the electronic design). The workflow may also include obtaining a gate-level representation of the electronic design that is equivalent to the RTL representation of the electronic design. In order to confirm that the RTL representation of the electronic design and the gate-level representation of the electronic design are equivalent, equivalence checking (e.g., formal equivalence checking) may be performed, to determine whether the RTL representation and the gate-level representation of the electronic design are equivalent.

Equivalence checking (e.g., formal verification checking) is a technique that may be used for comparing different Verilog designs and for determining whether these designs are logically equivalent. A method for functional safety verification that reduces the number of points to be checked using on fault relation rules, according to some embodiments of the present invention, may rely on the fact that at any level (RTL, gate-level, post place and route gate-level), the sequential logic elements in the electronic design (e.g., flip-flops, etc.) can remain present in any of these representations of the electronic design. Each sequential logic element can be driven from another sequential logic element and/or input/output (IO), and a truth table for any of these elements from the driven elements can be maintained throughout all of the physical design stages.

It may be fairly easy to map each sequential logic element from an RTL presentation of the electronic design to a gate-level element name, and from that, by analyzing the logic cone and the drivers of that sequential logic element may be compared between the RTL representation and other presentation (e.g., gate-level representation).

Fault relations rules are simple rules that can be based on detecting a fault at inputs/outputs of a sequential logic element, and can correlate that fault to a fault on other inputs/outputs of that sequential logic element.

According to some embodiments of the present invention, a user may run fault simulations at an RTL representation of an electronic design. The user may take a gate-level representation of the electronic design and the results from the RTL fault simulations, and use that information as the status (e.g., is it detectable) of the permanent faults (SA0/SA1) on the Q (output) of sequential logic elements in the gate-level model of the electronic design.

The user may use one or a plurality of fault relation rules to determine fault statuses either on logic driven by a sequential logic element (going forwards, further downstream the COI) or on logic that drives a sequential logic element (going backwards).

Figure 5:
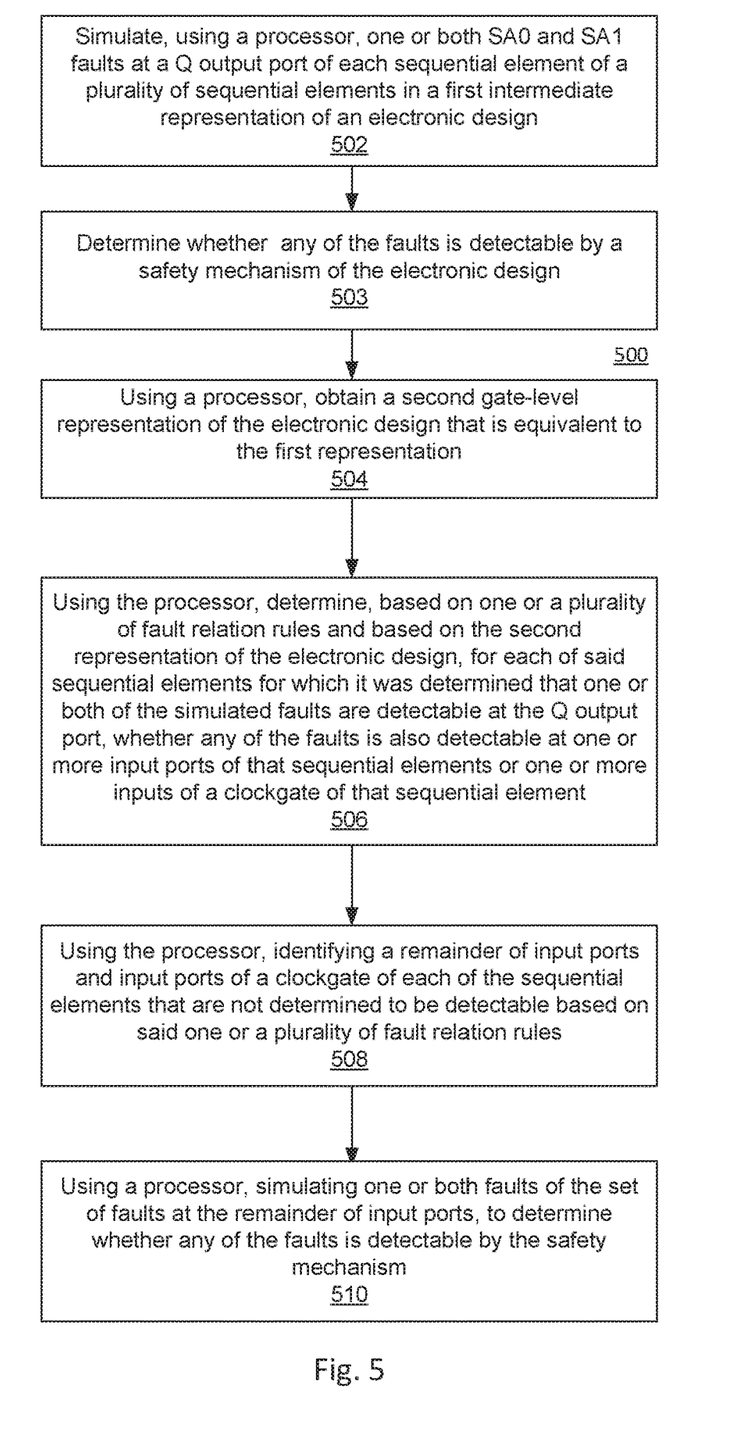
FIG. 5 schematically shows a method for functional safety verification of an electronic design, according to some embodiments of the present invention.

FIG. 5 schematically shows a method 500 for functional safety verification of an electronic design, according to some embodiments of the present invention.

Method 500 may include using a processor, simulating 502 one or both faults of a set of faults consisting of SA0 and SA1 at a Q output port of each sequential element of a plurality of sequential elements in a first representation of the electronic design, and determining 503 whether any of said simulated one or both faults is detectable by a safety mechanism of the electronic design. The first representation of the electronic design may be a RTL representation.

Method 500 may also include, using the processor, obtaining 504 a second gate-level representation of the electronic design that is equivalent to the first representation.

Method 500 may include using the processor, determining 506, based on one or a plurality of fault relation rules and based on the second representation of the electronic design, for each of said sequential elements for which it was determined that one or both of the simulated faults are detectable at the Q output port, whether any of the faults of the set of faults is also detectable by the safety mechanism if occurred at one or more input ports of that sequential element or one or more input ports of a clockgate of that sequential element.

Method 500 may also include using a processor, identifying 508 a remainder of input ports of each of the sequential elements and input ports of a clockgate of each of the sequential elements that are not determined to be detectable by the safety mechanism based on the one or a plurality of fault relation rules.

Method 500 may also include using the processor, simulating 510 one or both faults of the set of faults at the remainder of input ports and input ports of a clockgate of each of the sequential elements to determine whether said simulated one or both faults are detectable by the safety mechanism.

A method for functional safety verification of an electronic design, according to some embodiments of the present invention, may further include applying other fault relation rules on other components of the electronic design (e.g., fault equivalence rules, fault dominance rules), to further reduce the number of fault simulations that would be needed to complete the functional safety verification of the entire electronic design. Where necessary (e.g., for points in the electronic design that are not accounted for by fault relation rules) fault simulation may be used.

A method, according to some embodiments of the invention, may include calculating, using the processor, a diagnostic coverage grade for the safety mechanism of the electronic design based on detectability of the simulated one or both faults at the Q output port of each of said sequential elements and on detectability of at any input ports of each of the sequential elements or any input ports of a clockgate of that sequential element based on the one or a plurality of fault relation rules.

The sequential elements may comprise D-FFs and/or D-Latch FFs.

Figure 6:
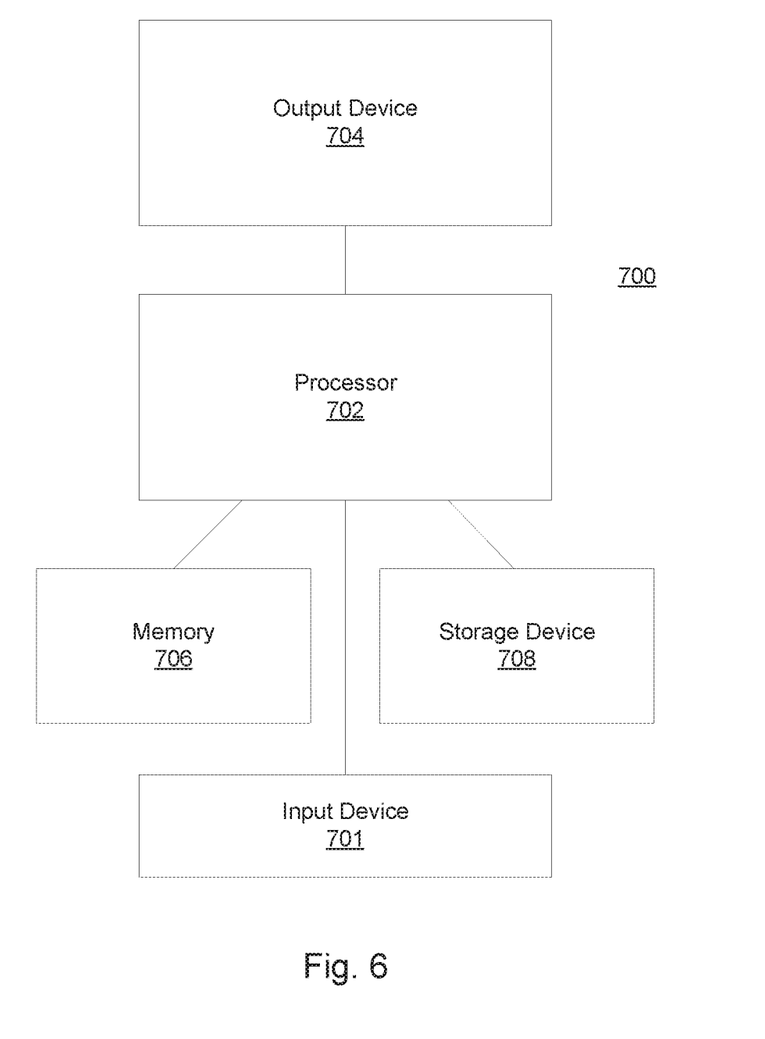
FIG. 6 shows a system for functional safety verification of an electronic design, according to some embodiments of the present invention.

FIG. 6 shows a system for functional safety verification of an electronic design, according to some embodiments of the present invention.

System 700 may include a processor 702 (e.g., single processor or a processing unit made that includes a plurality of processors, on a single machine or distributed on a plurality of machines) for executing a method according to some embodiments of the present invention. Processing unit 702 may be configured to perform a method according to some embodiments of the present invention and perform other actions and processing according to some embodiments of the present invention.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc., on which a program implementing a method according to some embodiments of the present invention and corresponding data may be stored. System 700 may further include an output device 704 (e.g. display device such as CRT, LCD, LED, OLED, etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc., for allowing a user to input commands and data.

Some embodiments of the present invention may be embodied in the form of a system, a method or a computer program product. Similarly, some embodiments may be embodied as hardware, software, or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stored on the computer readable medium may be in the form of an installed application or in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A computer implemented method for functional safety verification of an electronic design, the method comprising:
   using a processor, simulating one or both faults of a set of faults consisting of stuck at zero (SA0) and stuck at one (SA1) at a Q output port of each sequential element of a plurality of sequential elements in a first representation of the electronic design;
   using a processor, determining whether any of said simulated one or both faults is detectable by a safety mechanism of the electronic design;
   using the processor, obtaining a second gate-level representation of the electronic design that is equivalent to the first representation;
   using the processor, determining, based on one or a plurality of fault relation rules and based on the second representation of the electronic design, for each of said sequential elements for which it was determined that one or both of the simulated faults are detectable at the Q output port, whether any of the faults of the set of faults is also detectable by the safety mechanism if the respective fault occurred at one or more input ports of the respective sequential element or one or more input ports of a clockgate of that sequential element;

using a processor, identifying a remainder of input ports of each of the sequential elements and input ports of a clockgate of each of the sequential elements that are not determined to be detectable by the safety mechanism based on the one or a plurality of fault relation rules, and using the processor, simulating one or both faults of the set of faults at the remainder of input ports and input ports of a clockgate of each of the sequential elements to determine whether said simulated one or both faults are detectable by the safety mechanism.

2. The method of claim 1, further comprising calculating, using the processor, a diagnostic coverage grade for the safety mechanism of the electronic design based on detectability of the simulated one or both faults at the Q output port of each of said sequential elements and on detectability of said one or both faults at any input ports of each of the sequential elements or any input ports of a clockgate of the respective sequential element based on the one or a plurality of fault relation rules.

3. The method of claim 1, wherein the first representation of the electronic design is a register transfer level (RTL) representation.

4. The method of claim 1, wherein said sequential elements comprise data flip-flops (D-FFs).

5. The method of claim 4, wherein the set of one or a plurality of fault relation rules includes a first rule stating that when (i) SA0 at an output port Q of a data flip-flop (D-FF) of said D-FFs is detectable and (ii) a reset value for the respective D-FF is zero, each of the following statements are true: (a) SA0 on input port D of D-FF is also detectable; (b) SA0 or SA1 at clock toggle port of D-FF are, each, also detectable; and (c) if a clockgate exists SA0 on EN input port of the clockgate is detectable.

6. The method of claim 4, wherein the set of one or a plurality of fault relation rules includes a second rule stating that when (i) SA1 at output port Q of a D-FF of said D-FFs is detectable, and (ii) a reset value for the respective D-FF is one, each of the following statements is true: (a) SA1 on input port D of the D-FF is also detectable; (b) SA0 or SA1 at clock toggle input port of the D-FF are, each, also detectable; and (c) if a clockgate exists, then SA0 on EN input port of the clockgate is detectable too.

7. The method of claim 4, wherein the set of one or a plurality of fault relation rules includes a third rule stating that when SA1 and SA0 at output port Q of a D-FF of said D-FFs, are, each, detectable, each of the following statements is true: (a) SA0 or SA1 at clock toggle input port of the D-FF are, each, also detectable; and (b) if a clockgate exists, then SA0 on EN input port of the clockgate is detectable too.

8. The method of claim 1, wherein said sequential elements comprise D-Latch flip-flops.

9. The method of claim 8, wherein the set of one or a plurality of fault relation rules includes a fourth rule stating that when SA1 and SA0 are detectable at output port Q of a D Latch of said D-latch flip flops, SA0 at EN input port of the D Latch is detectable too.

10. A system for functional safety verification of an electronic design, the system comprising:
memory; and
a processor configured to:

obtain a first representation of the electronic design;
simulate one or both faults of a set of faults consisting of stuck at zero (SA0) and stuck at one (SA1) at a Q output port of each sequential element of a plurality of sequential elements in the first representation of the electronic design;
determine whether any of said simulated one or both faults is detectable by a safety mechanism of the electronic design;
obtain a second gate-level representation of the electronic design that is equivalent to the first representation;
determine, based on one or a plurality of fault relation rules and based on the second representation of the electronic design, for each of said sequential elements for which it was determined that one or both of the simulated faults are detectable at the Q output port, whether any of the faults of the set of faults is also detectable by the safety mechanism if occurred at one or more input ports of the respective sequential element or one or more input ports of a clockgate of the respective sequential element; and
identify a remainder of input ports of each of the sequential elements and input ports of a clockgate of each of the sequential elements that are not determined to be detectable by the safety mechanism based on the one or a plurality of fault relation rules.

11. The system of claim 10, wherein the processor is further configured to simulate one or both faults of the set of faults at the remainder of input ports and input ports of a clockgate of each of the sequential elements to determine whether said simulated one or both faults are detectable by the safety mechanism.

12. The system of claim 10, wherein the first representation of the electronic design is a register transfer level (RTL) representation.

13. The system of claim 10, wherein said sequential elements comprise data flip-flops (D-FFs), and wherein the set of one or a plurality of fault relation rules includes a first rule stating that when (i) SA0 at an output port Q of a data flip-flop (D-FF) of said D-FFs is detectable and (ii) a reset value for the respective D-FF is zero, each of the following statements are true: (a) SA0 on input port D of D-FF is also detectable; (b) SA0 or SA1 at clock toggle port of D-FF are, each, also detectable; and (c) if a clockgate exists SA0 on EN input port of the clockgate is detectable.

14. The system of claim 10, wherein said sequential elements comprise data flip-flops (D-FFs), and wherein the set of one or a plurality of fault relation rules includes a second rule stating that when (i) SA1 at output port Q of a D-FF of said D-FFs is detectable, and (ii) a reset value for the respective D-FF is one, each of the following statements is true: (a) SA1 on input port D of the D-FF is also detectable; (b) SA0 or SA1 at clock toggle input port of the D-FF are, each, also detectable; and (c) if a clockgate exists, then SA0 on EN input port of the clockgate is detectable too.

15. The system of claim 10, wherein said sequential elements comprise data flip-flops (D-FFs), and wherein the set of one or a plurality of fault relation rules includes a third rule stating that when SA1 and SA0 at output port Q of a D-FF of said D-FFs, are, each, detectable, each of the following statements is true: (a) SA0 or SA1 at clock toggle input port of the D-FF are, each, also detectable; and (b) if a clockgate exists, then SA0 on EN input port of the clockgate is detectable too.

16. The system of claim 10, wherein said sequential elements comprise D-Latch flip-flops, and wherein the set of one or a plurality of fault relation rules includes a fourth rule stating that when SA1 and SA0 are detectable at output port Q of a D Latch of said D-latch flip flops, SA0 at EN input port of the D Latch is detectable too.

17. A non-transitory computer readable storage medium for functional safety verification of an electronic design, having stored thereon instructions that when executed by a processor will cause the processor to:

obtain a first register transfer level (RTL) representation of the electronic design;

simulate one or both faults of a set of faults consisting of stuck at zero (SA0) and stuck at one (SA1) at a Q output port of each sequential element of a plurality of sequential elements in the first representation of the electronic design;

determine whether any of said simulated one or both faults is detectable by a safety mechanism of the electronic design;

obtain a second gate-level representation of the electronic design that is equivalent to the first representation;

determine, based on one or a plurality of fault relation rules and based on the second representation of the electronic design, for each of said sequential elements for which it was determined that one or both of the simulated faults are detectable at the Q output port, whether any of the faults of the set of faults is also detectable by the safety mechanism if occurred at one or more input ports of the respective sequential element or one or more input ports of a clockgate of the respective sequential element;

identify a remainder of input ports of each of the sequential elements and input ports of a clockgate of each of the sequential elements that are not determined to be detectable by the safety mechanism based on the one or a plurality of fault relation rules; and simulate one or both faults of the set of faults at the remainder of input ports and input ports of a clockgate of each of the sequential elements to determine whether said simulated one or both faults are detectable by the safety mechanism.

18. The non-transitory computer readable storage medium of claim 17, wherein said sequential elements comprise data flip-flops (D-FFs), and wherein the set of one or a plurality of fault relation rules includes a first rule stating that when (i) SA0 at an output port Q of a data flip-flop (D-FF) of said D-FFs is detectable and (ii) a reset value for the respective D-FF is zero, each of the following statements are true: (a) SA0 on input port D of D-FF is also detectable; (b) SA0 or SA1 at clock toggle port of D-FF are, each, also detectable; and (c) if a clockgate exists SA0 on EN input port of the clockgate is detectable.

19. The non-transitory computer readable storage medium of claim 17, wherein said sequential elements comprise data flip-flops (D-FFs), and wherein the set of one or a plurality of fault relation rules includes a second rule stating that when (i) SA1 at output port Q of a D-FF of said D-FFs is detectable, and (ii) a reset value for the respective D-FF is one, each of the following statements is true: (a) SA1 on input port D of the D-FF is also detectable; (b) SA0 or SA1 at clock toggle input port of the D-FF are, each, also detectable; and (c) if a clockgate exists, then SA0 on EN input port of the clockgate is detectable too.

20. The non-transitory computer readable storage medium of claim 17, wherein said sequential elements comprise data flip-flops (D-FFs), and wherein the set of one or a plurality of fault relation rules includes a third rule stating that when SA1 and SA0 at output port Q of a D-FF of said D-FFs, are, each, detectable, each of the following statements is true: (a) SA0 or SA1 at clock toggle input port of the D-FF are, each, also detectable; and (b) if a clockgate exists, then SA0 on EN input port of the clockgate is detectable too.

* * * * *